United States Patent [19]
Brown

[11] Patent Number: 5,501,067
[45] Date of Patent: Mar. 26, 1996

[54] SELECTIVE HARVESTING MACHINE

[76] Inventor: Claude E. Brown, 14281 Vintage Rd., Lodi, Calif. 95240

[21] Appl. No.: 282,751

[22] Filed: Jul. 29, 1994

[51] Int. Cl.⁶ .................................................. A01D 45/00
[52] U.S. Cl. .......................... 56/121.4; 56/13.1; 56/364
[58] Field of Search ................................ 56/12.7, 12.9, 56/13.1, 121.4, 364; 460/114

[56] References Cited

U.S. PATENT DOCUMENTS

| | | | |
|---|---|---|---|
| 3,126,693 | 3/1964 | Renn | 56/364 |
| 3,295,302 | 1/1967 | Lee | 56/364 |
| 3,323,196 | 6/1967 | Renn | 56/364 |
| 3,859,777 | 1/1975 | Doering | 56/16.7 |
| 4,539,801 | 9/1985 | Field | 56/364 |
| 4,597,252 | 7/1986 | Williames | 56/130 |
| 4,761,942 | 8/1988 | Williames | 56/130 |
| 5,134,837 | 8/1992 | Casey et al. | 56/12.8 |
| 5,175,984 | 1/1993 | Hale et al. | 56/130 |

*Primary Examiner*—George A. Suchfield
*Attorney, Agent, or Firm*—Majestic, Parsons, Siebert & Hsue

[57] ABSTRACT

A harvesting machine particularly useful in harvesting pyrethrum flowers has picking fingers resiliently mounted on a rotatable drum so as to capable of flexions in response to contact with plants during harvesting. The spacing between fingers in one array mounted on the drum is preferably different than the spacing in another array, with the more widely spaced array of fingers serving to comb through a plant canopy while the more closely spaced together array of fingers causes flower picking off the stem. The harvesting machine provides good efficiency picking of flower heads without a large amount of undesired plant material.

13 Claims, 5 Drawing Sheets

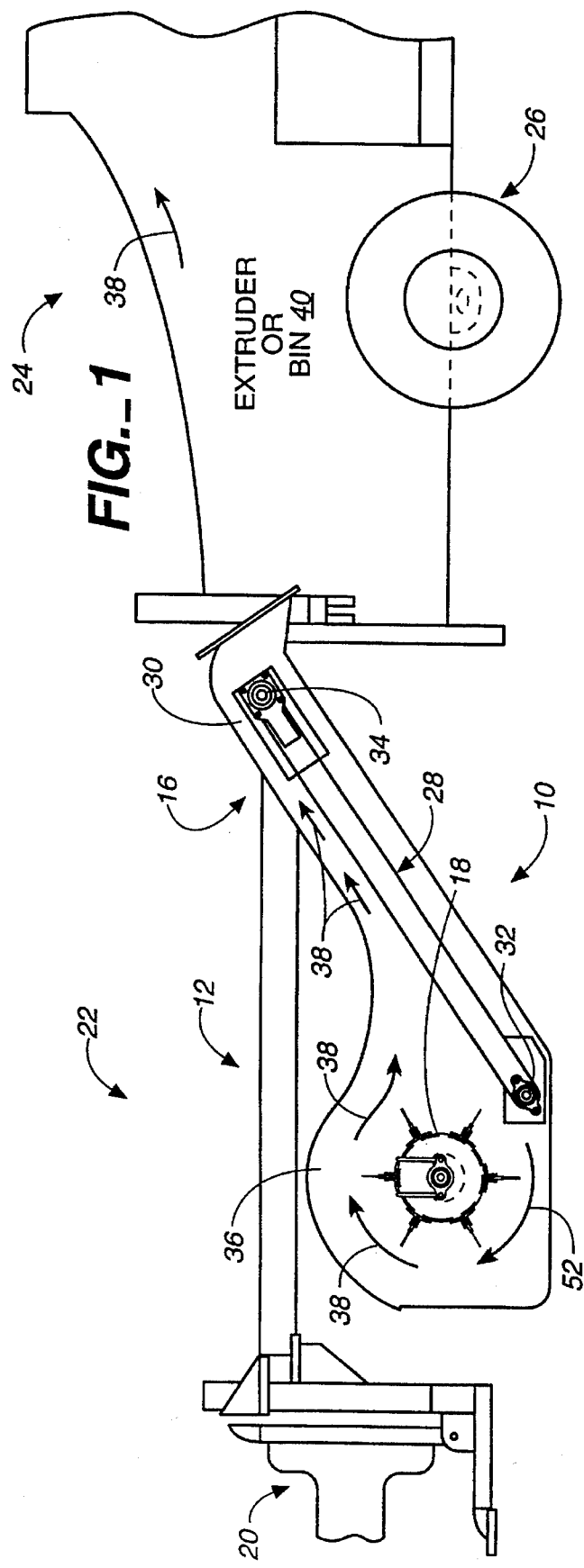

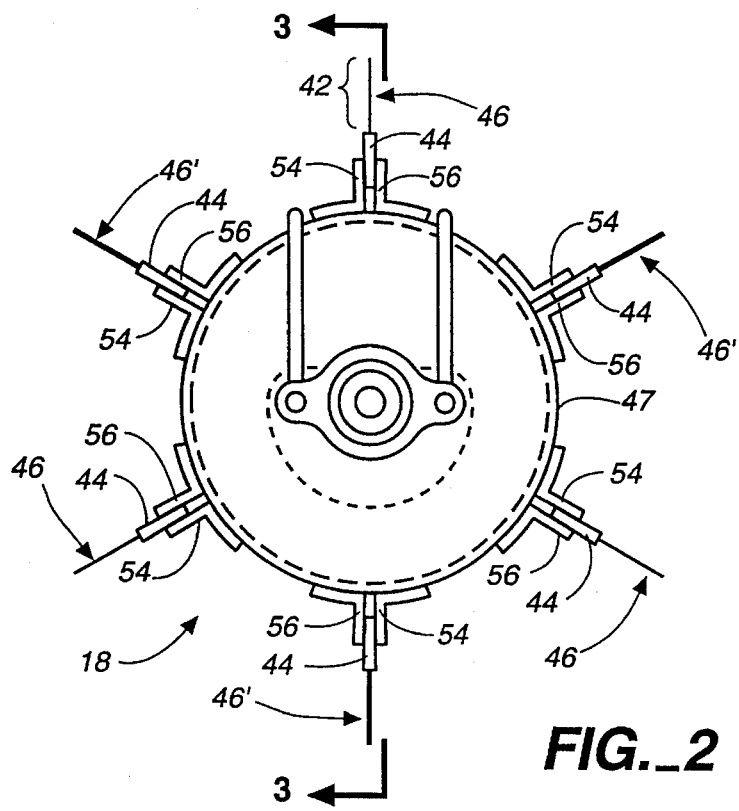
FIG._2
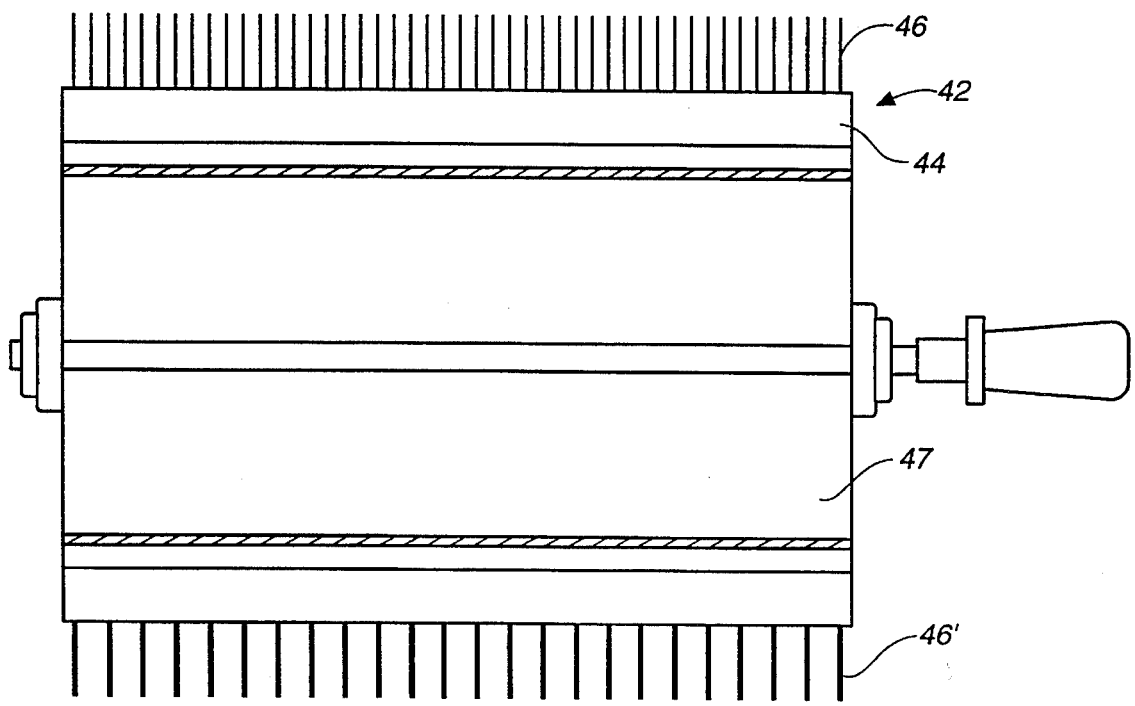
FIG._3

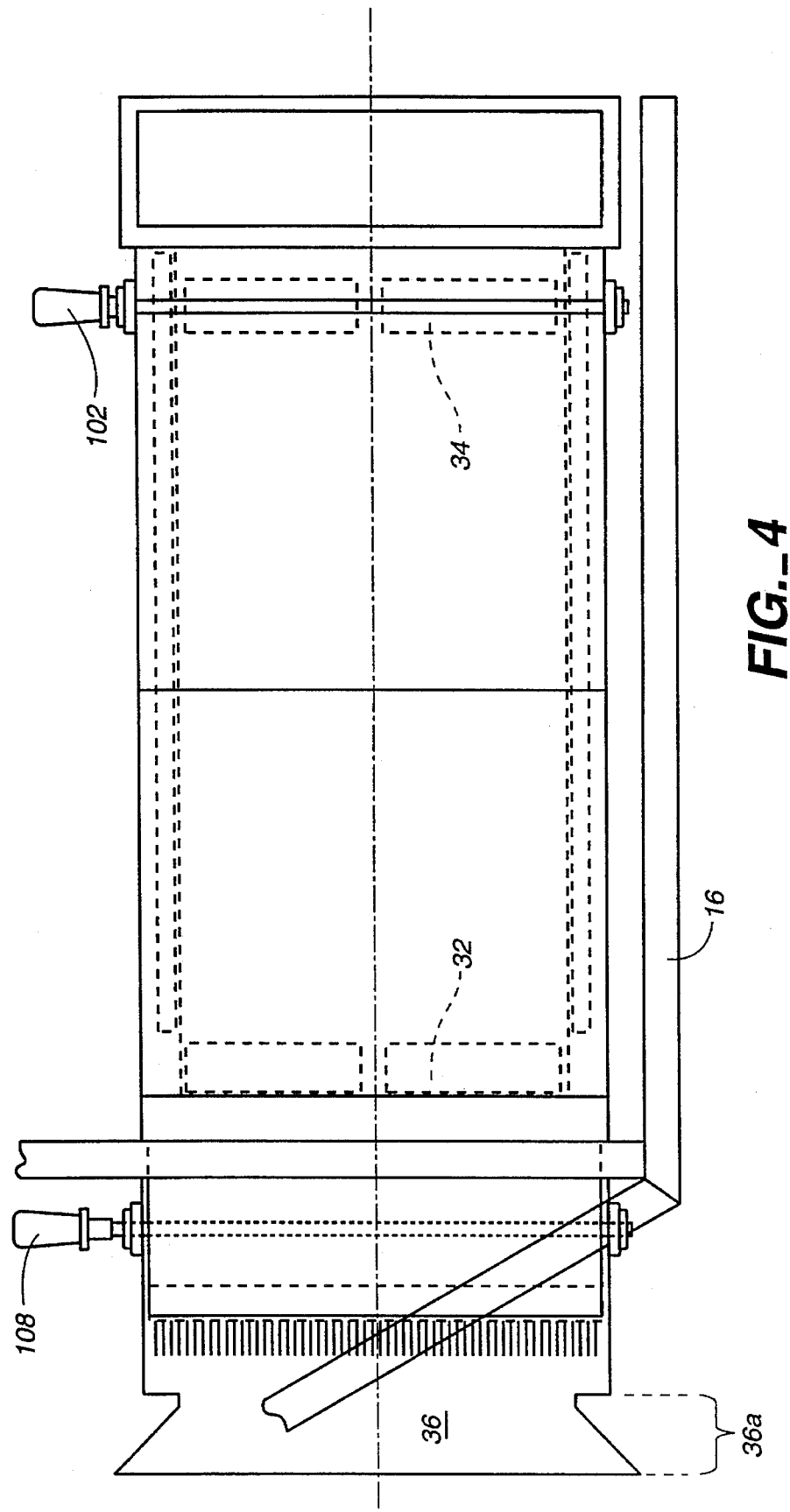

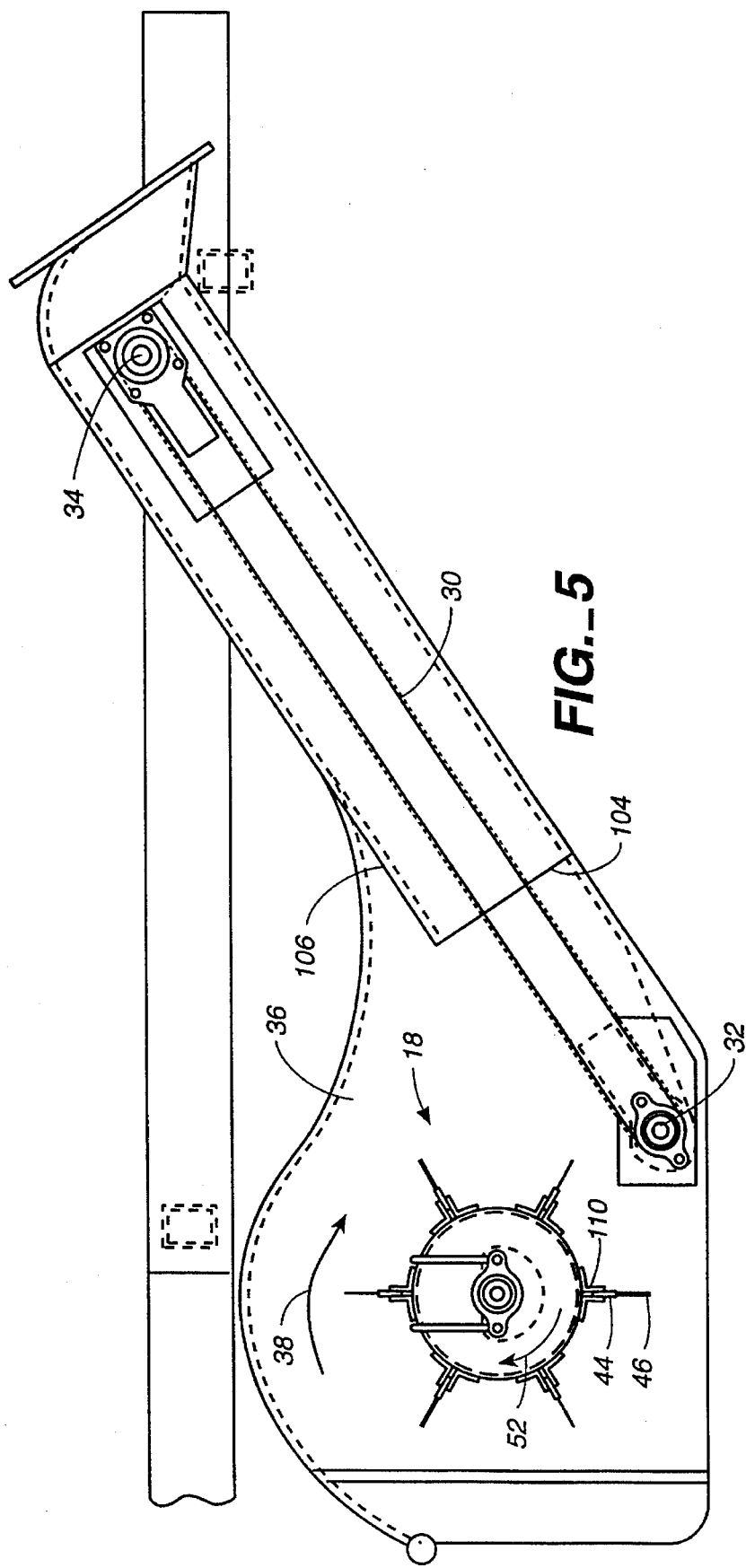

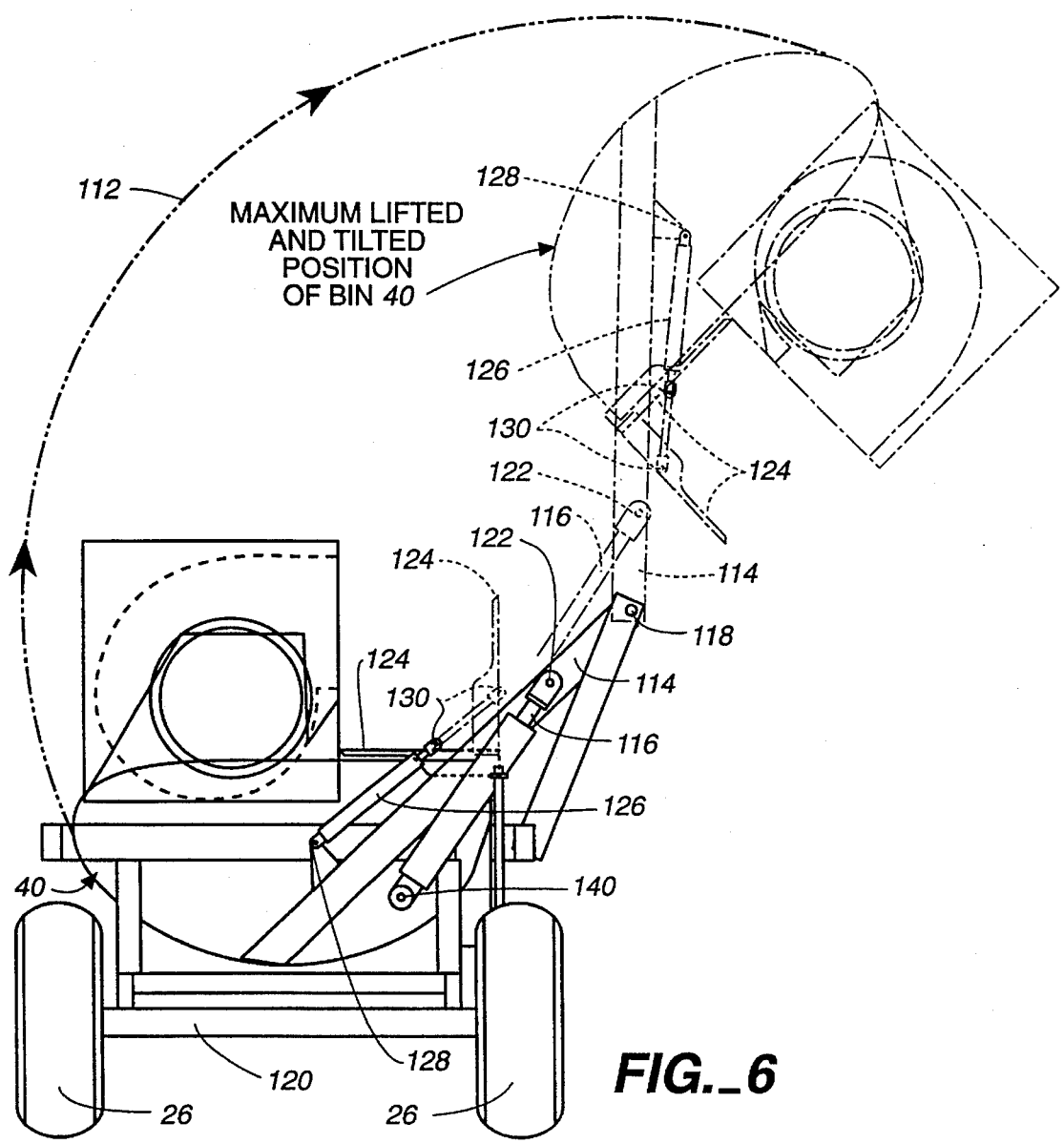

SELECTIVE HARVESTING MACHINE

FIELD OF THE INVENTION

The present invention generally relates to machines that harvest a desired crop part from a standing crop with a minimum of undesired plant materials harvested along with the desired crop part, and more particularly relates to harvesting pyrethrum flowers.

BACKGROUND OF THE INVENTION

Flowers of some chrysanthemum species include a relatively small, but commercially extractable, amount of volatile oils with insecticidal properties. These oils include the pyrethrins. Only a portion of the flower (in the disk) includes extractable pyrethrins, so inclusion of stem and leaf plant parts during harvesting is typically undesirable. Also, the amount of pyrethrins contained in the flower disk reaches a maximum during a relatively short period of time.

Attempts have been made to harvest pyrethrum flowers mechanically. U.S. Pat. Nos. 4,597,252, issued Jul. 1, 1986, inventor Williames, and 4,761,942, issued Aug. 9, 1988, inventor Williames, describe pyrethrum flower mechanical harvesters. These have not found commercial success due to unacceptably large amounts of the undesired stem and flower plant portions being included during use, and relatively low amounts of mature flowers are harvested from the total available flowers. Thus, substantially all of the world's harvest is presently being picked by hand.

SUMMARY OF THE INVENTION

It is an object of the present invention to efficiently mechanically harvest pyrethrum flowers with a minimum amount of non-flower plant materials being included in the harvest.

In one aspect of the present invention, a harvesting machine comprises a moveable frame, a rotatable drum, and a plurality of resilient fingers with sets of fingers being angularly spaced from each other on the drum. Each finger is resiliently held so as to be capable of flexions in response to contact with plants during harvesting. The harvester preferably is in integral combination with a conveyer and applied suction so that suction is applied adjacent to an upper portion of the drum and is above the picked flowers as they are being conveyed away from the drum. Once conveyed from the drum, the flowers may be sent directly to an extruder and be formed into pellets or may be collected in a bin ready for subsequent processing.

Experimental operation of an inventive embodiment has resulted in about 90–95% flower picking efficiency (based on a per plant analysis) with about 60–70% of the total pick being constituted by flowers when the embodiment was operated at about 1 mile per hour through a standing crop of pyrethrum plants.

BRIEF DESCRIPTION OF THE DRAWINGS

FIG. 1 is a side elevation, partially broken away, of an inventive embodiment

FIG. 2 is an end view of an element for the inventive embodiment;

FIG. 3 is a top view of the element also illustrated in FIG. 2;

FIG. 4 is a top view of an inventive embodiment;

FIG. 5 is a side elevation, partially broken away, of an inventive embodiment; and FIG. 6 is an end view of an inventive embodiment.

DETAILED DESCRIPTION OF PREFERRED EMBODIMENTS

Embodiments of the invention are machines that are useful in harvesting a selected portion of a plant with a minimum of undesired plant materials being harvested along with the desired crop part. Particularly preferred embodiments are useful for harvesting pyrethrum flowers, although the invention can be adapted to harvesting other plant parts or fruits. In view of the high yield of pyrethrum flowers obtained with the invention, the picked flowers can be conveyed directly to an extruder and be pelletized, which saves considerably on processing and sorting steps that are typical of many harvested crops.

Referring to FIG. 1, a harvesting apparatus embodiment 10 comprises a header 12 that will typically be movable across a standing crop by connection to a tractor 14 (not illustrated). However, the harvesting apparatus 10 could be self-propelled. A frame 16 supports a horizontally disposed, rotatably driven drum 18.

Drum 18 is preferably adjustable in height, or distance from the ground, by raising or lowering hydraulically. Thus, drum 18 may depend from frame 16 and be raised and lowered in a conventional manner, such as where raising and lowering is effected by being signaled by header height control communicating means 20, operable by a person conducting the harvesting, such as the tractor driver. Drum 18 is preferably carried at a forward frame portion 22 while a rearward frame portion 24 may include ground engaging means 26, preferably an opposed pair of tires rotatably connected by an axle, although a track-type tread could be utilized also. The drum surface is preferably smooth and substantially solid, since perforations in the surface will tend to entrap picked plant portions as the drum rotates while a smooth, solid surface permits the picked plant portion to be carried by the drum as it rotates and until the vacuum, or suction, described below helps to remove and convey the picked plant portion away from the drum and into a bin or into an extruder.

Header 12 preferably includes a conveyer 28, such as continuous belt 30 rotatable by forward and aft rollers 32 and 34. Drum 18 and conveyer 28 are preferably substantially enclosed by a shroud 36, which together with drum 18 and conveyer 28 form a passageway indicated by arrows 38. The harvested plant portion, such as flowers, will be assisted in traveling along passageway 38 rearwardly by application of suction, created by means such as a fan (illustrated in FIG. 6 as fan 140) that may be carried by rearward frame portion 24. The fan 140 may be ducted to bin 40 and thus remain on frame portion 24. The bin 40 may be used to collect the picked flowers that have traveled through passageway 38. Bin 40 is preferably tiltable so that the harvested crop can be readily discharged.

Turning to FIG. 2, drum 18 carries a plurality of mounts 42. The mounts 42 each include a resilient support 44, such as longitudinally extending blocks of rubber, in which an array of outwardly projecting fingers 46 are anchored and in which each of the fingers articulates so as to be capable of flexions (that is, bending) over substantially 360° in response to contact with plants during harvesting operations.

Referring to FIG. 3, the spacing between fingers 46 in one array may be different than the spacing in another array, where another array is shown as fingers 46'. The more widely spaced array is useful to comb through the plant canopy so that the stems with flowers are more uprightly positioned when the more closely spaced together array causes flower picking from the stem. Fingers 46 and 46' are typically rod-like, and may be formed from hard or rigid plastics or from a metal such as steel. Fingers 46 and 46' will typically outwardly project from supports 44 in the range of about 2 inches to about 8 inches, typically will have diameters of between about 0.062 inches to about 0.188 inches and will be spaced from each other a minimum of about 0.20 inches to a maximum of about 1.00 inches (with respect to the actual space between fingers, not as a center-to-center measure).

Returning to FIG. 2, the mounts 42 are angularly spaced about the drum surface 47. A longitudinally extending axis of rotation is parallel to (but spaced from or eccentric to) a drum axis, although the rotation axis and the drum axis can be congruent. The eccentric relationship between rotation axis and drum axis is preferred since this causes "wobble" (or a "pulsation" effect) as the drum 18 rotates, which in turn assists in combing fingers 46 and 46' through the canopy of the plants and also assists in preventing flowers from jamming in the fingers rather than feeding into passageway 38. The amount of offset, or eccentricity, will vary, depending primarily on plant height, and may be empirically determined in the field. Where, for example, the flower canopy is about 18 inches high, use of a drum diameter of 12 inches and an eccentricity of 35 thousandths of an inch has proven very effective. With shorter plants, then smaller diameters and larger eccentricities are believed desirable. A simple manner of accomplishing the eccentricity is, for example, to place the drum bore centerline offset from the drum longitudinal axis. Then the shaft on which the drum rotates will allow the "wobble" of the drum during rotation.

Mounts 42 may be constructed from conventional brackets in which are mounted the resilient supports 44, which are formed of rubber, polyurethane, or other elastomeric materials known to the art. With reference to FIG. 2, mounts 42 may be fastened to drum 18 by means of opposed brackets 54, 56, which hold resilient supports 44 and the finger arrays 46, 46' in the outwardly projecting position throughout the entire rotation of drum 18.

Returning to FIG. 1, arrow 52 indicates the preferred drum rotation direction so that as harvesting apparatus 10 moves through the standing crop the drum fingers tend to comb, or lift up, the canopy as drum 18 passes through while the offset rotation axis creates a "pulsation effect" to assist in keeping stems and flowers from lodging during harvesting.

As shown in FIG. 4, the shaft of the aft roller 34 for belt 30 may extend beyond shroud 36 and a handle 102 may be mounted on the portion of the shaft exterior of shroud 36, such that handle 102 is accessible from outside of shroud 36.

In FIG. 5, a conveyor box 104 and a conveyor box lid 106 are operatively associated with the shroud 36 and conveyor 28 as a conveyor subsystem. The height of conveyor box 104 may extend from below the conveyor belt to the top of shroud 36. The length of conveyor box 104 and lid 106 may extend from the rearward end of frame 16 partially to forward roller 32.

With further reference to FIG. 4, the shaft of drum 18 may extend beyond shroud 36 and another handle 108 may be mounted on the portion of the shaft exterior of shroud 36 such that handle 108 is accessible from outside of shroud 36.

In FIG. 5, and as earlier noted, each mount 42 may be comprised of conventional brackets 54, 56 to which a resilient support 44 is held, and preferably may be fastened by means such as a nut and a bolt and/or a clamping bar or the like. For example, each mount 42 may be mounted to drum 18 by means of an L-shaped bracket 110. L-shaped bracket 110 is preferably mounted in such a way that any flexions of the bracket due to contact of fingers 46 with objects and to drum rotation direction 52 would compress rather than expand the angle of bracket 110.

FIG. 4 also illustrates a shroud portion 36a forward of drum 18 and fingers 46. Shroud portion 36a preferably angles out to expand the latitudinal sweep of the machine beyond the axial length of drum 18. Thus, the preferred forward angled shroud portion 36a can guide a greater number of pyrethrum flower plants to drum 18, and thereby increase the area of harvest without increasing the size of drum 18.

Referring now to FIG. 6, when present (such as where an extruder is not present in the field) bin 40 preferably can be lifted and tilted for discharging the collected flower parts. The lifting and tilting preferably is one continuous motion 112, and may be completed by means of a moment arm 114 and a hydraulic or pneumatic lift piston 116. One end of moment arm 114 is fixed in bin 40 and the other end is pivotally connected to a point 118 above both bin 40 and ground engaging means 26. Point 118 is located latitudinally beyond axle 120 of ground engaging means 26 and is stationary relative to tractor 14, if one is used. One end of lift piston 116 is pivotally connected to a point in the tractor at 120 and the other end is pivotally connected to moment arm 114 at 122. By extending lift piston 116, bin 40 is lifted and tilted simultaneously. The phantom lines in FIG. 6 show bin 40 at its maximum position where moment arm 114 is perpendicular to axle 120. This is one mechanism to discharge flower parts from bin 40, but others may be used also. For example, one could use the bottom of the bin 40 to discharge.

In order to maintain the collected flower parts in bin 40 until they are ready to be discharged, bin 40 comprises a lid 124. Lid 124 is kept in the closed position while the machine is harvesting flowers and while bin 40 is being lifted and tilted so that the flower parts are only discharged at the operator's signal. The lid is controlled by means of a hydraulic or pneumatic piston 126. One end of piston 126 is pivotally connected at 128 inside bin 40 and the other end is pivotally connected to lid 124 at 130. Once bin 40 has been lifted and tilted to the maximum position, by opening lid 124, the flower parts may be discharged with aid from the force of gravity.

Aspects of the invention will now be illustrated by the following example, which is intended to illustrate, but not limit, the invention.

EXAMPLE 1

An embodiment of the invention was used to experimentally test harvest a field of pyrethrum plants under development by Botanical Resources, Inc. of Salem, Oregon. The field of plants was located in the Salinas valley of California. The pyrethrum plants were judged to be at or near the peak of pyrethrum production (with the flower rays being about ½–¾ open). The plant canopies were generally in the range of 18–24 inches with rows of plants side-by-side and tractor wheel furrows disposed on either side of double planted rows (a center of one tractor furrow being spaced about 40 inches from an adjacent wheel furrow center). Each plant had from about 300 to about 600 flowers, and the plants were about 9 months old from having been transplanted into the field. The harvest weather conditions were not optimum, as some significant rain had unexpectedly fallen the night before and the plants were somewhat heavy and tending to lodge.

The harvesting apparatus embodiment was tractor-pulled at a rate of about 1 mph. The drum or reel speed was about 40–85 rpm with the higher speed being preferred. A fan was operated to provide suction adjacent to the drum, whose operation reduced the amount of undesired stem being harvested by about 30–40%. The fan was operated at about 1000–3000 rpm. The drum was 12 inches to 24 inches from the ground with respect to plant base canopy level and had a drum diameter of 12 inches.

There were six finger arrays. Three of the arrays of fingers had a spacing from each other (between the fingers) of about 5/16 inches and the other three arrays (which were disposed alternatively with respect to the 5/16 inch spaced arrays) of fingers had a spacing of about 7/16 inches. The fingers all projected from their supports by 3¼ inches and the fingers all had diameters of 100 thousandth of an inch. The amount of eccentricity (where the rotation axis was spaced from the drum axis) was 35 thousandth of an inch. The fingers had been molded and were inserted into holes that had been bored in the resilient supports 44. The overall projection of rubber mount and fingers from the smooth drum surface was about 6 inches.

After a considerable plant row distance had been picked, picking efficiency was estimated as about 90–95% of the flowers being picked, based on a per plant analysis, while the harvest itself in the bin was estimated as about 60–70% of flowers with the rest being other plant portions. Further, the undesired plant portion, or chaff, was primarily disposed in the rear of the bin since the heavier flowers tended to fall or be tossed off onto the conveyor while the lighter chaff was partially separated due to the vacuum or sucking action in the passageway from shroud to bin. Plant lodging or flower entanglement in the drum did not appear to be a problem despite the moist conditions.

As will be understood by the illustrative example just described, due to the high picking efficiency of the pyrethrum flowers by use of the inventive harvesting apparatus, an extruder such as is known to the art could be associated with the conveyor box 104 so that the flowers being sucked off the conveyor could proceed directly into the extruder and be pelletized. Whether the inventive apparatus has a bin to collect the harvest for conveyance to a site where further processing is performed, has an associated extruder for direct processing, or has other equipment associated therewith as will be understood to persons skilled in the art, the present invention provides an apparatus to efficiently mechanically harvest pyrethrum flowers with a minimum amount of non-flower plant materials.

It is to be understood that while the invention has been described above in conjunction with preferred specific embodiments, the description and examples are intended to illustrate and not limit the scope of the invention, which is defined by the scope of the appended claims.

It is claimed:

1. A machine, useful in harvesting a selected portion of a plant, comprising:

a moveable frame;

a drum having a longitudinally extending axis and being rotatably mounted on the frame and wherein a shaft defines the rotation axis, the shaft and the drum axis together being parallel to but spaced from each other;

a plurality of longitudinally extending resilient mounts carried by the drum, the mounts being angularly spaced about a longitudinally extending axis of rotation parallel or congruent with respect to the drum axis; and, a plurality of spaced apart picking fingers, the fingers outwardly projecting from the mounts, each finger being resiliently held in the mount so as to be capable of flexions over substantially 360 degrees in response to contact with plants during harvesting use of the machine.

2. The machine as in claim 1 wherein the spaced apart rotation axis and drum axis causes a pulsation effect as the drum rotates and is adapted to retard flower jamming in the picking fingers.

3. A machine, useful in harvesting a selected portion of a plant, comprising:

a moveable frame;

a drum having a longitudinally extending axis and being rotatably mounted on the frame;

a plurality of longitudinally extending resilient mounts carried by the drum, the mounts being angularly spaced about a longitudinally extending axis of rotation parallel or congruent with respect to the drum axis; and, a plurality of spaced apart picking fingers, the fingers outwardly projecting from the mounts, each finger being resiliently held in the mount so as to be capable of flexions over substantially 360 degrees in response to contact with plants during harvesting use of the machine wherein the mounts each have an array of fingers with the spacing between fingers of one array being different than the spacing between fingers of an other array.

4. The machine as in claim 1 or 3 further comprising:

a shroud, the shroud and drum forming a passageway adapted to permit application of suction adjacent to an upper portion of the drum;

means for applying suction in the passageway; and, a conveyer disposed in the passageway.

5. The machine as in claim 3 wherein the drum carries a plurality of one arrays and a plurality of other arrays with the one and other arrays being in an alternating relationship.

6. The machine as in claim 5 where the fingers outwardly project from the mounts in a range of about 2 inches to about 8 inches.

7. The machine as in claim 5 wherein the fingers are spaced from each other in a range of about 0.20 inches to about 1.00 inches.

8. The machine as in claim 5 wherein the fingers have diameters of between about 0.062 inches to about 0.188 inches.

9. The machine as in claim 5 wherein the mounts include opposed brackets having resilient supports held therein.

10. The machine as in claim 9 wherein the resilient supports are formed of rubber or other elastomeric materials.

11. A machine, useful in harvesting a selected portion of a plant, comprising:

a moveable frame;

a drum having a longitudinally extending axis and being rotatably mounted on the frame;

a plurality of longitudinally extending resilient mounts carried by the drum, the mounts being angularly spaced about a longitudinally extending axis of rotation parallel or congruent with respect to the drum axis;

a plurality of spaced apart picking fingers, the fingers outwardly projecting from the mounts, each finger being resiliently held in the mount so as to be capable of flexions over substantially 360 degrees in response to contact with plants during harvesting use of the machine;

a shroud, the shroud and drum forming a passageway adapted to permit application of suction adjacent to an upper portion of the drum;

means for applying suction in the passageway; and, a conveyer disposed in the passageway.

12. The machine as in claim 11 wherein an extruder is associated with the conveyor and adapted to form pellets from harvested plant portions.

13. The machine as in claim 1, 3, or 11 wherein the selected portion of a plant for harvesting is a pyrethrin flower.

\* \* \* \* \*